May 17, 1927.
P. D. RITCHEY ET AL
1,628,741
ADJUSTABLE PIN GAUGE
Filed Oct. 4, 1926
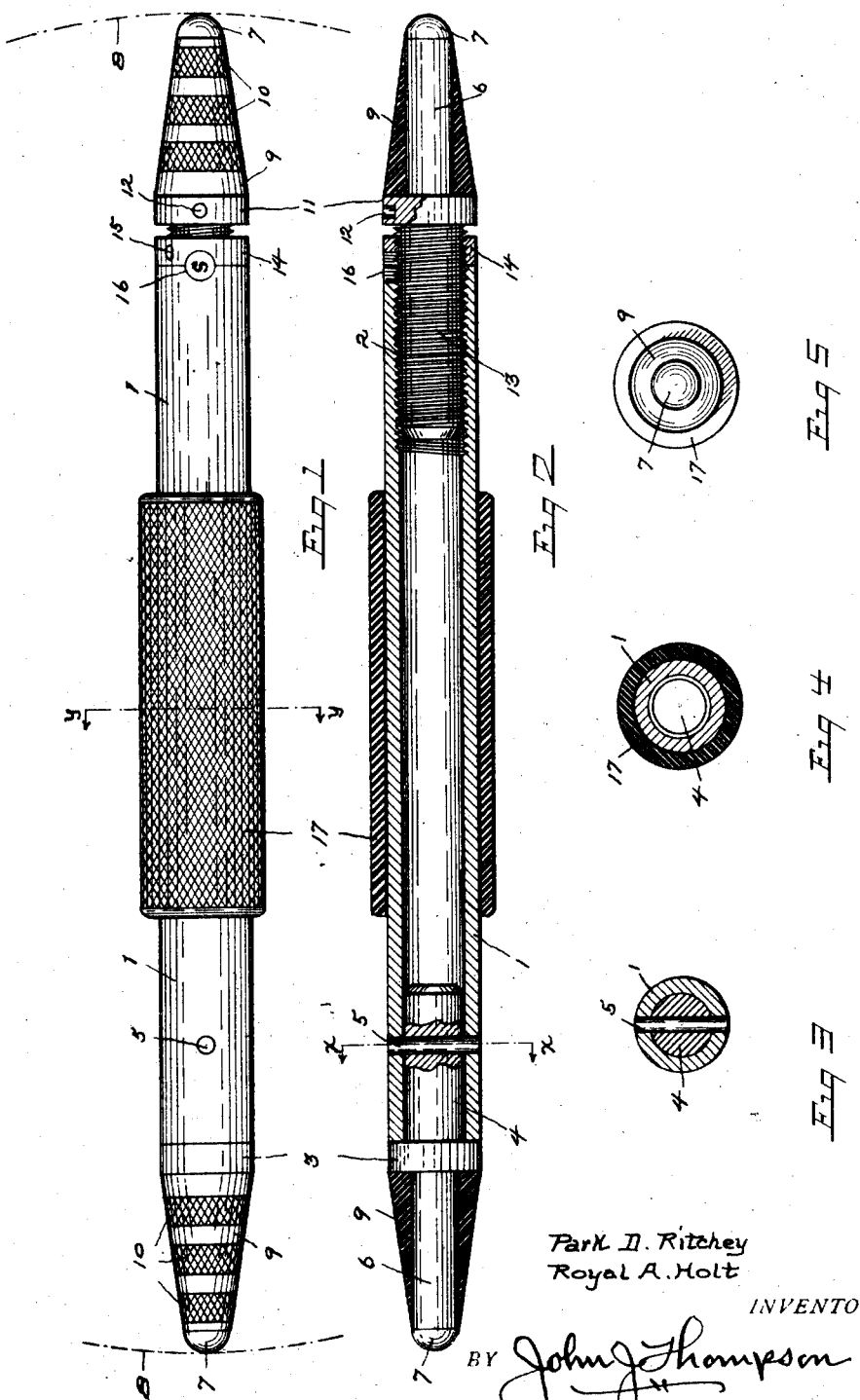
Park D. Ritchey
Royal A. Holt
INVENTORS
BY John J. Thompson
ATTORNEY Patented May 17, 1927.

1,628,741

UNITED STATES PATENT OFFICE.

PARK D. RITCHEY, OF POUGHKEEPSIE, AND ROYAL A. HOLT, OF WAPPINGERS FALLS, NEW YORK, ASSIGNORS TO STANDARD GAGE COMPANY, INC., OF POUGHKEEPSIE, NEW YORK, A CORPORATION OF NEW YORK.

ADJUSTABLE PIN GAUGE.

Application filed October 4, 1926. Serial No. 139,566.

This invention relates to an adjustable pin gauge of that class which is employed for measuring, checking, or inspection of internal diameters, or measurements between two surfaces, such as cylinders, etc.

Such a gauge after being set to the required dimension from a master gauge or gauge blocks, and locked and sealed against unauthorized alteration, is employed in the shop for the checking of measurements.

While pin gauges are now in use, they are not adjustable to compensate for wear, or for slight changes within their scope, and they are ground and lapped to a predetermined length, and if the ends become damaged they have to be either discarded or reground to a smaller size.

The object of the present invention is to provide a pin gauge, so constructed as to be adjustable as to length within its limits, and provided with locking means to retain the dimension to which it is set.

Another object of the invention is to provide in an adjustable pin gauge, means for sealing the adjusting means, whereby the size or set of the gauge can not be altered without destroying said seal.

Still another object being to provide not only a hand grip of heat insulating material, but finger grips near the ends of said gauge, also of insulating material, by which the gauge can be handled and tried in the work; the object of said insulating material being to keep the heat of the hand from the metal of the gauge, thus preventing any expansion taking place, which would change the dimensions of the gauge, which would cause inaccuracy while in use, and furthermore these parts of insulation tend to protect the gauge from damage when laid on the bench or table.

With these and other objects in view, our invention consists in certain construction and combination of parts as will hereinafter be fully described and claimed in the specification, and illustrated in the accompanying drawings which form a part hereof, and in which like figures of reference refer to corresponding parts in all of the views, and it is fully understood that slight changes may be made without departing from the spirit of the invention.

In the drawings:—

Figure 1 is a side view of the complete gauge.

Figure 2 is a longitudinal view, partly in section.

Figure 3 is a cross sectional view, taken on the line X—X of Figure 1.

Figure 4 is a cross sectional view, taken on the line Y—Y of Figure 1.

Figure 5 is an end view.

Referring to the drawings, the device comprises, a handle or body portion 1, made from steel tubing or other suitable material, and formed with internal threads 2, in one end thereof.

Within the ends of said body 1 are mounted the ends or plugs which are formed as follows: The stationary plug is formed with flange or collar 3 integral with the plug portion 4, which is a force fit within the end of the body 1, to which it is secured by the cross pin 5; and the outer or gauging portion 6 which is formed with the rounded end 7 for contact with the work 8; this part to be ground and lapped, and mounted on the portion 6 is a tapered sleeve 9 of insulating material such as fibre, which is formed with the knurled bands to form a finger grip and insulate the heat of the operators hand from the gauging surface or portion 6.

The other or adjustable plug is formed with the collar 11 provided with one or more holes 12 for the reception of a spanner wrench; and this collar 11 is also integral with the shank 13 which is formed with the screw threads to coact with the internal threads 2 of the body 1, in such a manner that by turning or rotating the collar 11 with respect to the body 1, the distance between said collar 11 and the end of the body 1 can be altered.

The remaining portion of this adjustable plug is similar to the stationary plug, in that it is formed with a gauging portion 6, and contact surface 7, and an insulated finger grip 9.

For locking the adjustable plug with respect to the body 1, there is provided a threaded ring or collar 14, which is mounted on the threaded shank 13 between the collar 11 and the end of the body 1; and this ring 14 is adapted to be brought tight up against the end of the body 1, and to act as a jam nut to prevent the shank 13 from turning within the threaded end of said body 1.

For rotating said ring or collar 14, it is provided with one or more holes 15 for the reception of a spanner wrench.

As a seal for preventing the unauthorized movement of said lock ring 14, there is formed a recess 16, one half in the surface of said ring 14 and the other half in the surface of the body 1; the two halves registering with each other when the ring 14 is screwed tight against the end of said body 1; and into said recess 16 is placed a sealing compound, such as wax or lead, which may be marked with a letter or other device.

The body 1, is also provided with a knurled sleeve or hand grip 17, of insulating material, to prevent the heat from the operators hand from expanding or elongating the gauge.

In the setting of the gauge, the locking ring 14 is backed off from contact with the end of the body 1; the collar 11 is then rotated to set the two gauging surfaces 7—7 the correct distance apart, and the locking ring is rotated into contact with the end of the body 1, bringing the two halves of the recess 15 in registry with each other, and the same is filled with the sealing compound.

In the operation of the gauge, it may be inserted into the work either by the hand grip, or by grasping the finger grips with either hand.

As the hand grip 17 is of larger diameter than the body 1, the gauge when placed on a bench or table will rest thereon, and will also be insulated therefrom.

Having thus described our invention, what we claim as new, and desire to secure by Letters Patent, is:

1. In a pin gauge of the class described, comprising tubular metallic body portion having internal threads at one end, a pair of metallic end pieces, formed with hardened, ground and lapped contact surfaces, each of said end pieces formed with a collar and a shank, one of said shanks formed with threads coacting with said internal threads, a threaded locking ring mounted on said shank and adapted to act as a jam nut against the end of said body portion, the abutting edges of said locking ring and said body portion formed with cut out portions adapted to register with each other to form a recess for the purpose of receiving a sealing compound.

2. A pin gauge of the class described, comprising a tubular body portion having internal threads at one end, a pair of plugs, comprising a collar and a shank integral therewith, the shank of one plug being rigidly secured in one end of the body portion, threads formed on the other shank and coacting with the threaded end of said body portion, a locking ring threaded on said threaded shank and adapted to be forced against the end of said body portion to prevent said shank from being rotated therein, the abutting edges of said ring and body portion formed with cut out portions, said cut out portions registering with each other when said ring is locked, and an insulating hand grip mounted on said tubular body portion, and insulating finger grips mounted on said plugs.

In testimony whereof we hereunto affix our signatures.

PARK D. RITCHEY.
ROYAL A. HOLT.